United States Patent
Loni et al.

(10) Patent No.: US 7,298,953 B2
(45) Date of Patent: Nov. 20, 2007

(54) MOUNTING OF OPTICAL COMPONENTS

(75) Inventors: Armando Loni, Ledbury (GB); Roger Timothy Carline, Malvern (GB)

(73) Assignee: Qinetiq Limited (GB)

( * ) Notice: Subject to any disclaimer, the term of this patent is extended or adjusted under 35 U.S.C. 154(b) by 0 days.

(21) Appl. No.: 10/491,838

(22) PCT Filed: Oct. 2, 2002

(86) PCT No.: PCT/GB02/04444

§ 371 (c)(1), (2), (4) Date: Apr. 5, 2004

(87) PCT Pub. No.: WO03/029852

PCT Pub. Date: Apr. 10, 2003

(65) Prior Publication Data

US 2004/0240831 A1 Dec. 2, 2004

(30) Foreign Application Priority Data

Oct. 3, 2001 (GB) ................................ 0123741.1

(51) Int. Cl.
*G02B 6/00* (2006.01)
(52) U.S. Cl. ...................... 385/137; 385/70; 247/479
(58) Field of Classification Search ................ 385/137, 385/70, 83, 98, 99; 248/479; 247/479
See application file for complete search history.

(56) References Cited

U.S. PATENT DOCUMENTS

| | | | |
|---|---|---|---|
| 4,307,935 A | 12/1981 | Monnier | |
| 4,702,547 A | 10/1987 | Enochs | |
| 5,016,972 A | 5/1991 | Schlaak | |
| 5,066,091 A | 11/1991 | Delahanty et al. | |
| 5,351,331 A * | 9/1994 | Chun et al. | 385/97 |
| 5,359,687 A | 10/1994 | McFarland | |
| 5,566,269 A | 10/1996 | Eberle et al. | |
| 5,715,338 A | 2/1998 | Steijer et al. | |
| 5,961,849 A | 10/1999 | Gravensen et al. | |
| 2002/0051607 A1* | 5/2002 | Ido et al. | 385/49 |

FOREIGN PATENT DOCUMENTS

| | | |
|---|---|---|
| EP | 0 555 968 | 8/1993 |
| EP | 0 667 543 | 8/1995 |
| JP | 62-280705 | 12/1987 |
| JP | 08-122564 | 5/1996 |
| JP | 08-248285 | 9/1996 |
| JP | 11-261164 | 9/1999 |
| WO | WO 96/38752 | 12/1996 |

* cited by examiner

*Primary Examiner*—Ellen E. Kim
(74) *Attorney, Agent, or Firm*—McDonnell Boehnen Hulbert & Berghoff LLP

(57) ABSTRACT

An optical element (3) is mechanically retained within a slot of (2) in a rigid substrate (1), e.g. of a ceramic or crystalline material, by contact with the sides of the slot. Where the difference between a dimension of the optical element and the slot width at ambient temperature is a very small and positive, it may be removed by heating the substrate and/or cooling the element (differential thermal expansion) to allow insertion of the element. Then the temperature difference is removed so that the element is mechanically retained under compression by the slot sides. Alternatively, where the element may be directly inserted so that it is in contact with or immediately adjacent the slot wall, the material of the substrate and/or the optical element is the oxidized in the region of contact so as to increase the dimension of the oxidized material and mechanically retain the element. Either technique is applicable to parallel sides slots, but the element may be additionally or alternatively mechanically retained by shaping the edges of the slot. The fibre (3) shown may be butted against a second fibre, or coupled to a guide or other element within the substrate.

33 Claims, 5 Drawing Sheets

MOUNTING OF OPTICAL COMPONENTS

BACKGROUND OF THE INVENTION

1. Field of the Invention

The present invention relates to the mounting of an optical element to a substrate, and particularly but not exclusively to the joining of an optic fibre to a substrate and to coupling of an optic fibre to a further optical element located in or on a substrate.

2. Description of the Art

A number of techniques are known for coupling an optic fibre to an on-chip optical waveguide or chip facet. The most common approach is to align the fibre and to secure it in place by the use of a UV-curing epoxy adhesive. Alignment is achieved merely by butting the end of the fibre to the waveguide/chip facet, or, for better location, by securing the fibre with adhesive within a V-groove in the chip. One of the major problems associated with the use of epoxy adhesives is that they can degrade over time due to temperature cycling and ageing effects, causing misalignment between fibre and waveguide/chip facet.

In "Silicon Nitride Micro-Clips for the Kinematic Location of Optic Fibres in Silicon V-shaped grooves", R M Bostock et al, J Micromech & Microeng, 8 (1998), page 343, there is reported a technique in which flexible clips are surface-machined out of silicon nitride and are used to hold a fibre in place in a V-groove. However, there are disadvantages in that micro-manipulation is necessary to insert the fibre beneath the clips, and multiple process steps are required to form the clips in the first place.

The prior art techniques mentioned above rely on manual or semi-automated alignment and are time-consuming.

SUMMARY OF THE INVENTION

The present invention provides a mechanical approach in which self-alignment is possible, thereby facilitating the production of a reliable coupling with repeatability, and a more automated approach. The resulting product is resistant to ageing and cycling over temperatures typically experienced in field use of described under the appropriate military standards, and ideally is also mechanically strong.

In a first aspect, the present invention provides an optical arrangement comprising a first rigid substrate having a slot and a first optical element mounted within the slot, said element being mechanically retained by contact with the sides of the slot.

International Patent Application No. WO 96/38752 (Whitaker Corporation), U.S. Pat. No. 5,566,269 (Whitaker Corporation) and U.S. Pat. No. 5,359,687 (McFarland) each disclose constructions for mechanically holding optic fibres with strain relief, but that strain relief is afforded by the use of plastics in the constructions which by their very nature afford a degree of flexibility. U.S. Pat. No. 4,702,547 (Enochs) discloses a method of attaching an optical fibre to the surface of a substrate using a channelled retaining member which is soldered over the fibre, which itself is provided with an external gold layer. Retention is therefore not by mechanical contact with the side of a slot in a substrate, or even by mechanical with the sides of the retaining member.

The rigid substrate may be of a ceramic material, such as glass or silicon, or a crystalline material, such as silicon.

The mechanical retention is preferably such that the element is non-releasably retained, i.e. removal thereof from the slot is accomplished only with very great difficulty or not at all without destroying the element and/or substrate.

If the slot has substantially parallel sides, the element may be retained under compression by the sides of the slot. Alternatively, or additionally, the element may be mechanically retained by the shaping of the sides of the slot, which are preferably parallel, but not necessarily so.

Mechanical retention by compression may be achieved by the use of differential thermal expansion, for example by cooling the element and/or heating the substrate, placing the element within the slot and allowing the temperature difference between the element and substrate to disappear.

Shaping of the sides of the slot may be achieved by a chemical reaction such as oxidation of the first element and/or the first substrate in the region of contact, for example where the first element is of silica, e.g. a fibre, and the first substrate is of silicon or other suitable oxidisable material, or where the first element is of silicon, and the first substrate is of silicon or silica. The conversion of the silicon to silica is accompanied by an increase in the dimension of the material resulting in the slot becoming narrower, and/or the element becoming thicker, and/or the wall of the slot growing round the element. It will be understood that the first two of these effects relate to increasing the compressive force exerted by the slot walls on then element, whereas the third effect limits movement of the element vertically within the slot. Thermal oxidation is mentioned in the description of the embodiments, and it could be used in conjunction with the differential thermal expansion effect. However, it is also envisaged that a relatively cool oxidation or other wall shaping process may be employed per se.

The first element may be mounted so that it is in substantial optical alignment with an optical component within the substrate, for example in substantial abutment with the optical component. This optical component, for example a waveguide, may itself be formed within the first substrate. Alternatively it may be a second optical element such as an optic fibre which is mechanically retained by the sides of the slot, e.g. under compression and/or by wall shaping.

The slot in the first substrate may commence at one edge of the first substrate. It may extend between opposed edges of the first substrate.

The first element may be an optic fibre. The first substrate may be of a semiconductor material such as silicon.

The first element and/or a second element may be further secured to the first substrate by any means known per se, including the use of an adhesive.

Where the first element is an optic fibre, the first substrate may be mounted to a second substrate. In such a case, a surface of said second substrate may include an optical component mounted or formed thereon, the first substrate being mounted to the said surface of the second substrate with the optic fibre in alignment with said optical component.

Alternatively, a surface of the second substrate may include an optical component recessed or formed therein, with the first substrate being mounted in a depression in the said surface of the second substrate with the optic fibre in alignment with said optical component.

Preferably, the first and second substrate have co-operating projections and holes or slots for relative alignment thereof. For securing the substrates together, at least one projection may be formed to be a slightly oversize fit in its hole or slot, such that it may be cooled relative thereto for insertion, and is gripped thereby on temperature equalisation. It will be appreciated that the projection and hole may or may not have corresponding shapes, so that the gripping may occur in one or both dimensions, and to avoid excessive stress it is preferred that the gripping is effected in one dimension only (for example by use of an elliptical peg and a circular hole or vice versa, or the use of a slot to accommodate the projection).

By forming the projection(s) to be so gripped in one or both dimensions, and/or by forming projection(s) to have an accurate fit in one or both dimensions, the location of the first substrate relative to the second may be precisely controlled in the corresponding dimension or dimensions. If only one projection is oversize or an accurate fit, and it is circular, it is possible to rotate one substrate relative to the other, so for full location a second oversize or accurately fitting projection is required. Alternatively the single projection and its hole may have a non-circular section to prevent rotation. Other projections, if any, in these arrangements may have an accurate or oversize fitting in their holes or slots, or some or all may have a slack or loose fit.

Alternatively, all the projections may be sized and shaped relative to the holes (or slots may be used) so that there is latitude for adjustment of alignment of the first substrate along one or both dimensions of the second substrate surface. In this case a different means is preferably provided for securing the substrates together.

Any means known per se, including the use of adhesive may be used for this purpose, but where the first substrate within a depression in the second substrate, preferably the depression has vertical opposed walls between which said first substrate is gripped mechanically under compression. This technique may be used per se, or in addition to the provision of a gripped projection(s).

Where the first element is an optic fibre, an end thereof may lie substantially flush with an edge of the second substrate. If the fibre has a lateral portion projecting above the surface of the first substrate, the second substrate may be recessed to accommodate the projecting portion. The invention also provides a method of mounting an optical element in a substrate by forming a parallel sided slot in the substrate, the difference between a dimension of the optical element and the slot width at ambient temperature being a very small positive amount, producing a positive temperature differential between the substrate in the region of the slot and the optical element such that the said dimension is now no more than the slot width, inserting the optical element therein and allowing the said temperature differential to diminish. The temperature differential may be produced by the heating of the substrate, or the cooling of the optical element, or both.

The invention further provides a method of mounting an optical element in a substrate by forming a slot in the substrate, e.g. a parallel sided slot, inserting the optical element therein so that it is in contact with or immediately adjacent the walls of the slot, and thereafter oxidising the material one or both of the first substrate and the optical element in the region of contact whereby to increase the dimension of the oxidised material so to mechanically retain the element within the slot. It will be appreciated that the tolerance permissible with respect to initial contact with the slot walls will depend on how great a dimensional increase can be obtained for successful mechanical retention.

The optical element may be an optic fibre, so that the said dimension is the diameter of the fibre for a circular cross-section, or a width thereof for a non-circular cross-section (this could be either width for a rectangular section, but will normally be the smaller diameter for an elliptical section fibre). In such a case the slot depth needs to be at least equal to the radius of the fibre.

The slot may be formed with a depth less than the diameter of the fibre(s) so that a portion thereof projects above the surface of the first substrate, or a depth equal to or greater than the diameter of the fibre(s).

Wherein the substrate includes or is provided with an optical component with an input surface or aperture, the inserting step may comprise butting an end of the optic fibre against said aperture. In such a case, the slot forming step may be controlled so that the fibre contacts the bottom of the slot when in alignment with said aperture. The component provided on the substrate may be formed integrally within the substrate, adjacent or spaced below its surface, or a separate component which is mounted within the substrate or within a section of the slot.

In the latter case, the method may include the step of mounting the component (for example another optic fibre) within the section by producing a positive temperature differential between the slot section and the component, inserting the component, and allowing the differential to disappear. The mounting of the fibre and the separate component to the substrate may be performed sequentially (in either order) or simultaneously.

Once the optic fibre has been mounted to the first substrate, the latter may in turn be mounted the first substrate to a second substrate with the fibre in optical alignment with (and preferably abutting) an optical component on or in the second substrate. If the fibre projects above the first substrate surface, preferably but not necessarily a groove is formed in the substrate to house the projecting portion of the fibre.

The invention also encompasses a method of coupling two optic fibres comprising the steps of forming a parallel vertical sided slot in the surface of a first substrate, the difference between the diameter of the fibres and the slot width at ambient temperature being a very small positive amount, producing a positive temperature differential between the substrate in the region of the slot and the optic fibres such that the fibre diameter is now no more than the slot width, inserting the optic fibres therein with their ends butting, and allowing the said temperature differential to disappear.

The invention extends to constructions in which the first substrate is mounted to a second substrate, and to constructions in which one or more further fibres or other components are mounted to the same substrate, and to associated methods of forming such constructions.

DESCRIPTION OF THE FIGURES

Further features and advantages of the invention will become clear upon a consideration of the appended claims, to which the reader is referred, and upon a reading of the following description of embodiments of the invention made with reference to the accompanying drawings, in which:

Where appropriate like reference numerals are used to denote the same feature in the different embodiments.

DESCRIPTION OF A PREFERRED EMBODIMENT

Figure 1:
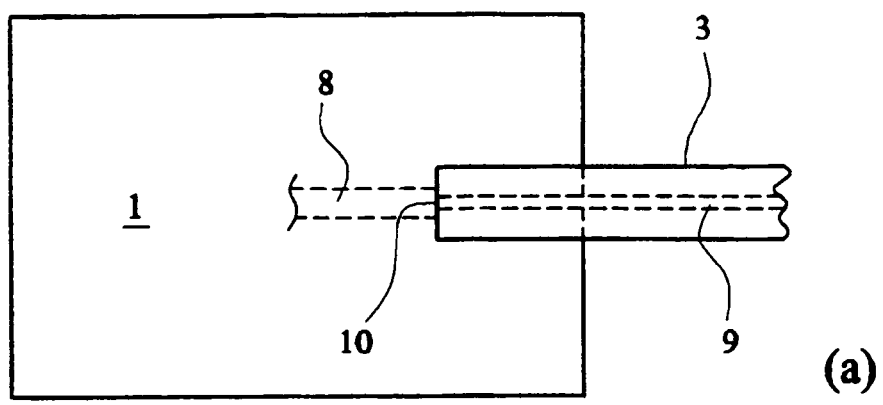
FIGS. 1a to 1d show plan side and end cross sectional schematic views of an optic fibre mounted in a substrate according to a first embodiment of the invention, with FIG. 1d being an enlarged detail of FIG. 1c.
Figure 1:
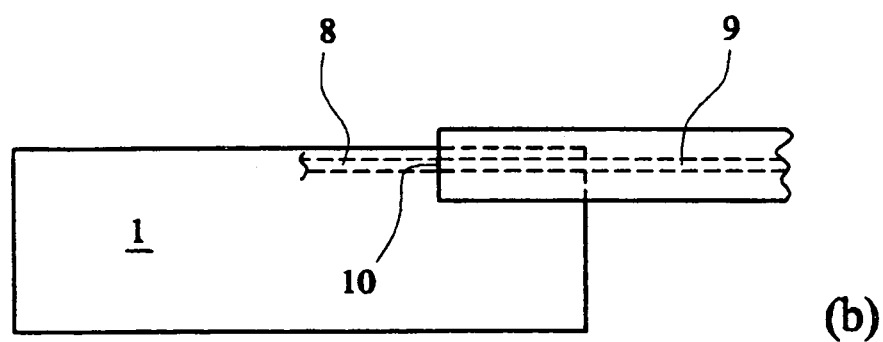
Figure 1:
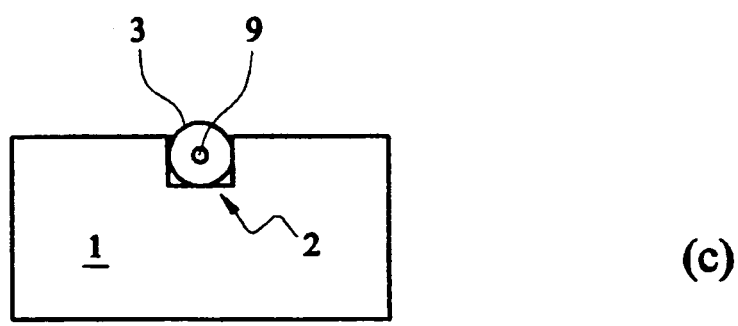
Figure 1:
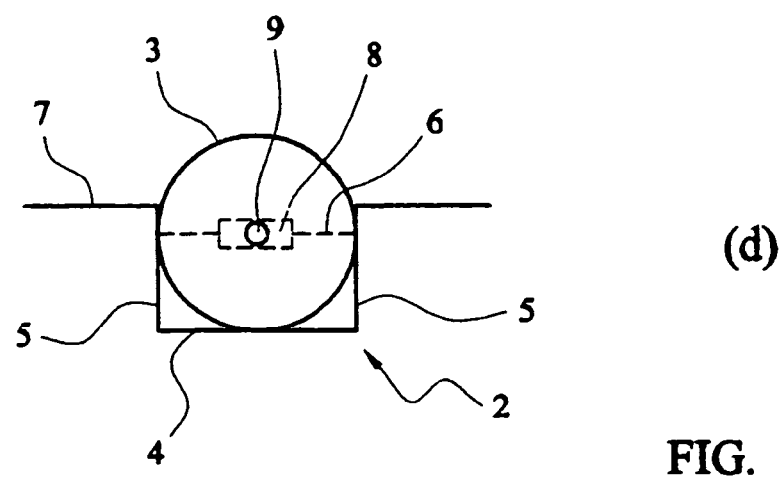

In FIG. 1 a parallel-sided vertical slot 2 is dry etched in a silicon substrate 1, the slot being 124.8 to 124.9 microns wide and 70 microns deep. A silica fibre 3 of 125 micron diameter is cooled in liquid helium or liquid nitrogen to cause its diameter to contract to 124.65 or 124.75 microns respectively, each of which is less than the slot width. The fibre is inserted into the slot until it touches the bottom 4 of the slot, by which time its diameter 6 is laterally adjacent the sides 5 of the slot below the chip surface 7, and the temperature differential between the assembled substrate and fibre is then removed, e.g. by allowed the entire assembly to come to ambient temperature. During this process the fibre diameter increases until the fibre is firmly gripped between the slot sides 5 with a force which is a function of the precise relative dimensions of the separate fibre and slot. Optionally, the silica fibre 2 is then bonded to the silicon slot walls 5 by thermal oxidation to make the assembly even more rugged.

In this embodiment, the slot terminates at the end face 10 of a waveguide 8 formed just below the surface 7 of the silicon substrate. Thus by firmly butting the end of the optic fibre against the end face of the waveguide as the fibre is allowed to come to the temperature of the substrate an efficient, stable and strong optical coupling between the fibre core 9 and waveguide is obtained. Accurate alignment of the core 9 relative to the guide 8 in the vertical direction is controlled by suitable adjustment of the slot depth. Although as shown, the slot depth is such that a portion of the fibre projects above the substrate surface, the slot can be made deeper to accommodate the fibre flush with or below the substrate surface, and in part this will depend of the location of the guide 3 and the fibre diameter.

Furthermore, as shown the slot 2 extends to one edge of the substrate. It should be understood that this is not always necessary, particularly with a larger substrate, where the slot may start and end within the boundaries of the surface 7, and the fibre 3 may be flexed to enter the slot.

Figure 2:
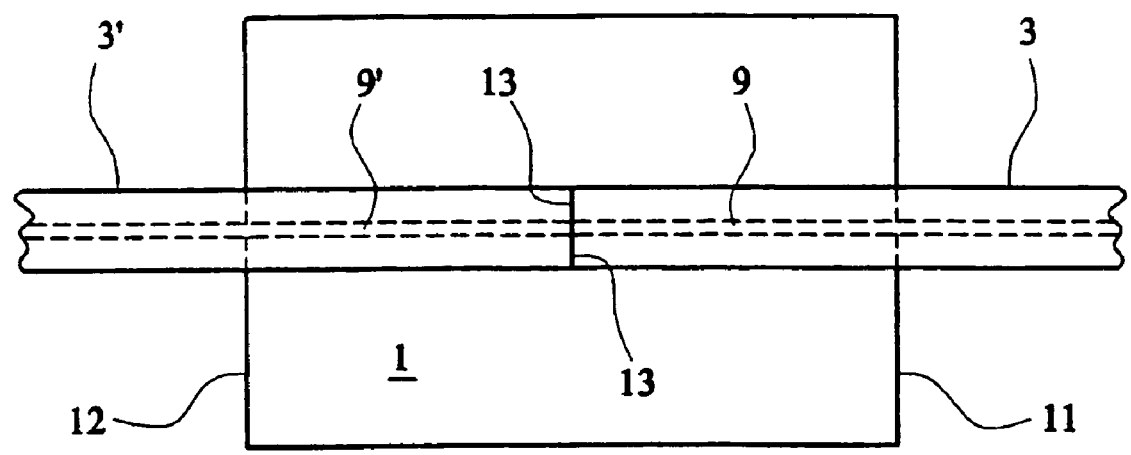
FIG. 2 shows a schematic plan view of a second embodiment.

The second embodiment shown in FIG. 2 is somewhat similar to the first. However, the substrate contains no waveguide, and the slot is modified to extend from one end 12 of the substrate to the opposed end 12. The optic fibre and a second fibre 3' are cooled so that their diameters are reduced to slightly below the slot width, and they are both placed in the slot so that their ends 13 abut around halfway along the substrate. The fibres are then allowed to warm to ambient temperature so that they are gripped by the slot walls. With the fibres inserted so that they touch the bottom surface of the slot, they are firmly located in all three dimensions and their cores are accurately aligned and in contact at their ends for efficient coupling. Again, either or both ends of the slot may terminate within the boundaries of surface 7 if the fibres are suitably flexed into position.

Alternatively, a first fibre 3 is mounted within the slot by relative cooling and warming as before, so that it terminates within the slot, and subsequently the second fibre 3' is mounted within the slot by relative cooling and warming to terminate in abutment and alignment with the first fibre. This process only requires two components to be joined at any stage, and either component may be inserted into the slot first.

In a modification of FIG. 2 (not shown) the slot comprises two sections of different appropriate cross-sectional dimensions, in which can be mounted first and second differently sized optical fibres, either simultaneously or sequentially, as described above in respect of FIG. 2.

Figure 3A:
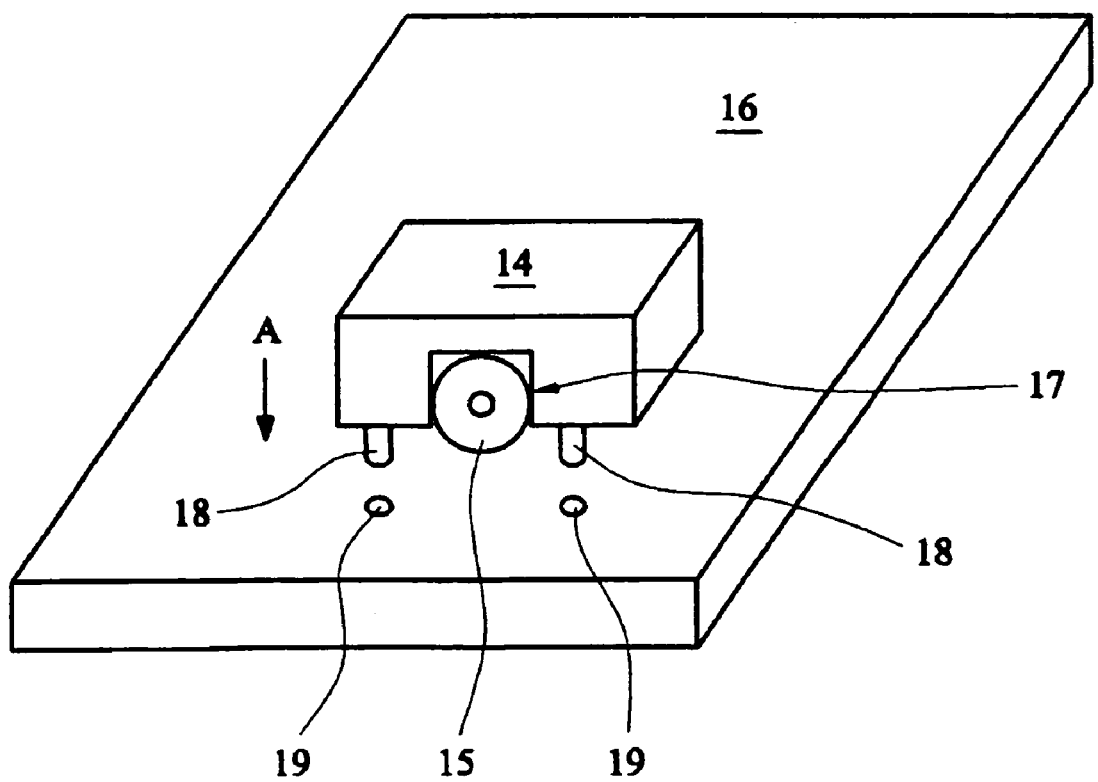
FIG. 3a shows a perspective schematic view of a third embodiment.
Figure 3B:
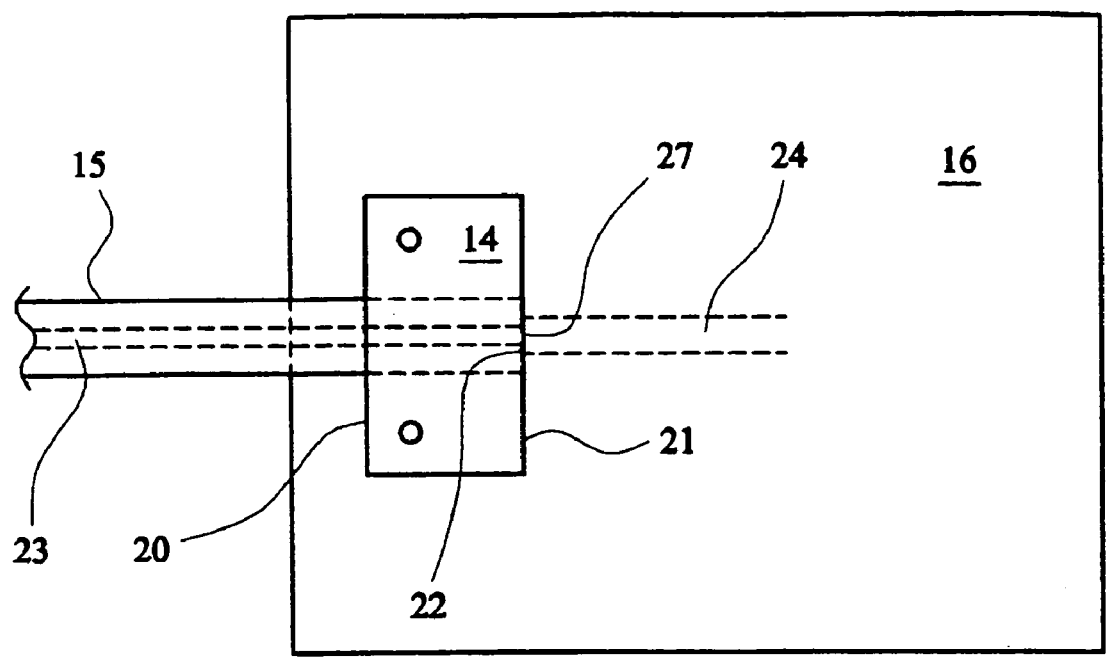
FIGS. 3b and 3c show schematic cross-sectional plan and side views of the third embodiment.
Figure 3C:
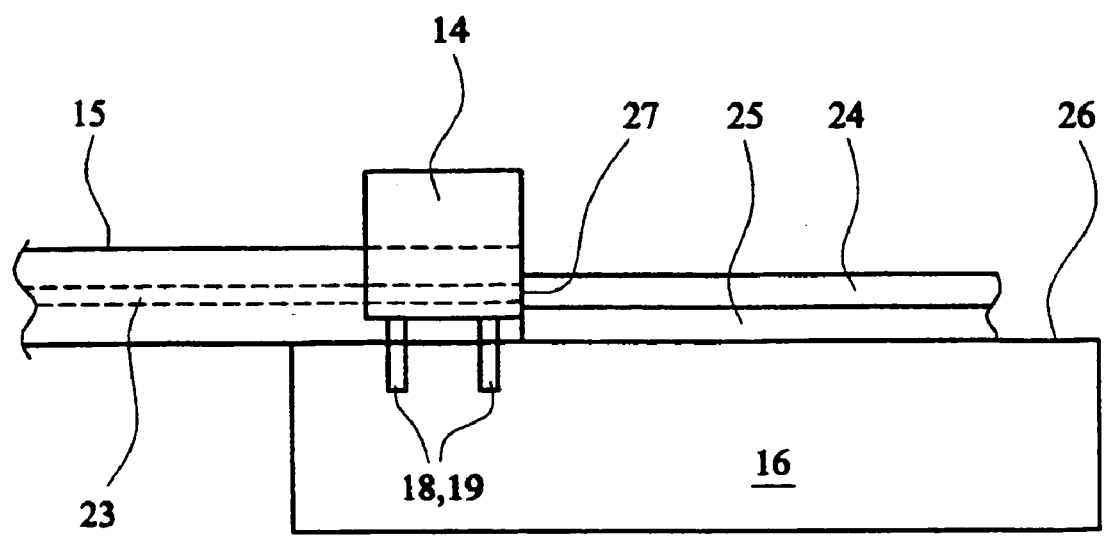

In FIG. 3 a smaller substrate or "chip" 14 is used for mounting an optic fibre 15, and is itself mounted on a larger substrate 16. As in FIG. 2, the chip 14 is provided with a vertical sided slot 17 which extends between two opposed faces 20, 21 of the chip, and the slot 17 is dimensioned so that the fibre 7 is mounted and gripped therein by cooling and subsequent warming, and so that the fibre end 22 is flush with the face 21, or extends therefrom. In the latter case, the projecting end of the fibre may be used as it is, particularly of the projection is minor, but preferably the fibre is subsequently treated, for example by grinding/polishing, so that it lies flush with the chip face.

The bottom face of the chip 10 is provided, e.g. by etching, with optional locating pegs 18 that are complementary to holes 19 in the substrate 8, to provide for accurate alignment of the chip 14 on substrate 16 as the chip is moved in the direction of the arrow A.

On the top surface 26 of the substrate 16 is formed an optical device such as a waveguiding layer 24 above an intermediate layer 25, with its entrance aperture 27 located so that the fibre end 22 abuts it with its core 23 aligned with the guide when the chip 14 is in position. The chip may then be secured on the substrate by any known means, such as an adhesive, e.g. epoxy, and/or by any of the differential thermal expansion techniques described in more detail below.

The pins 18 may be an accurate fit in the holes 19, to facilitate alignment. Alternatively, there may be some play in one or both dimensions to permit a final adjustment for optical alignment prior to securing the chip. In particular, there may be play in the direction along the fibre propagation axis, while the fit in the other direction is accurate, so that the best abutment may be secured between the fibre 23 and the guide 24, while maintaining the alignment laterally of the fibre direction. Vertical alignment is determined by contact between the fibre, which as shown projects beyond the chip surface, and the substrate surface 26. However, if desired, the chip could be mounted so there is no fibre-surface contact if that provides the best optical alignment. Nevertheless, it should be noted that in either of these options the bottom surface of the chip is spaced from the surface 26, and these arrangements could lead to excessive leverage being applied to the pins, for example during use or manipulation.

Figure 4:
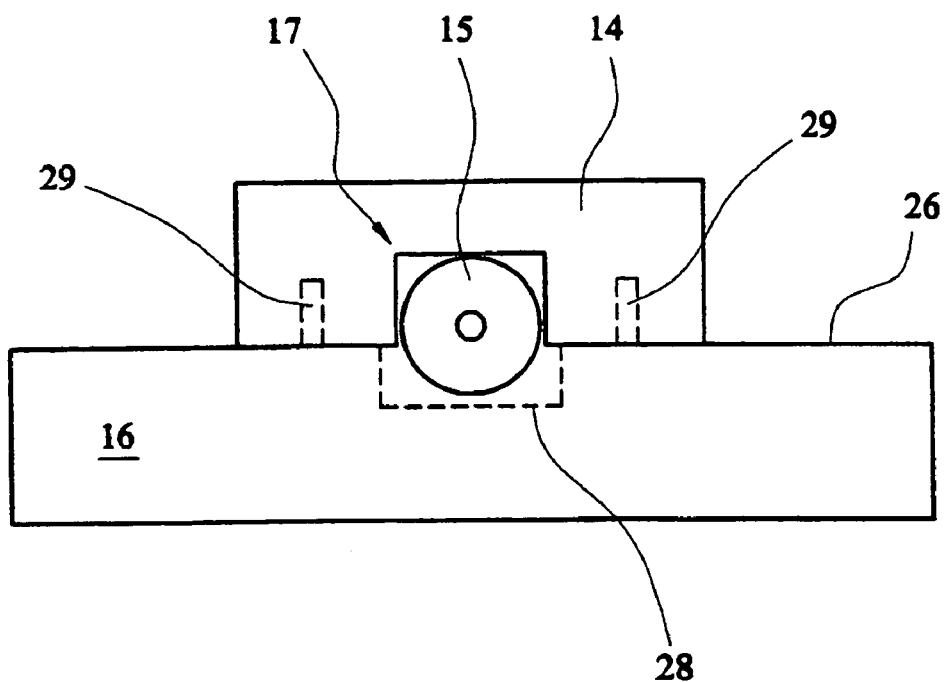
FIGS. 4 and 5 show end cross sectional schematic views of fourth and fifth embodiments of the invention.

Therefore in a modification the substrate surface 26 is provided with a recess 28 to accommodate the projecting fibre portion as shown schematically in FIG. 4. Although the recess 28 shown as oversized, it will be appreciated that its wall could contact part or all of the projecting fibre portion, depending on its shape and dimensions. The recess provides the additional advantage that a close contact may be provided between the bottom of the chip 14 and the surface 26, and the latter can be of use if it is desired to further secure the chip 14 and substrate 16 together as by adhesive and/or thermal oxidation.

It will also be appreciated that the pegs and holes may be interchanged, and accordingly FIG. 4 shows pegs 29 on substrate 16 projecting into complementary holes in the chip 14. Depending on how the chip 14 is secured to the substrate it may even be possible to have pegs on each of the chip and substrate for locating in complementary holes in the other.

However, in a further modification of the "chip" arrangement, the pegs are gripped in the holes by relative thermal expansion, and in such a case all the pegs need to be on either the substrate or the chip. In this modification, the width of the holes is slightly less than the width of the pegs in at least one dimension, and the part bearing the pegs is cooled so that the pegs can be inserted, whereupon on thermal equilibration the pegs are tightly gripped to hold the chip 14 in a desired alignment on the substrate 16. Should this part be the chip 14, it will be understood that the fibre 15 remains tightly gripped in the slot 17 during this operation since the temperatures of fibre and chip remain approximately equal.

While this thermal gripping may occur in both dimensions, it is preferred that the pegs are gripped in a direction laterally of the fibre only. The fit in the other dimension may be accurate, but preferably the holes are shaped so a degree of movement along the fibre direction is accommodated before thermal equilibration, so that, for example, the end of the fibre may be precisely and tightly abutted against the optical component or guide on the substrate 16.

The pegs and holes are sized so that when the pegs are cold relative to the holes, the pegs are capable of entering the holes, but when there is no temperature differential therebetween, the pegs are sufficiently large to exert a force on the walls of the holes thereby preventing removal.

Figure 5:
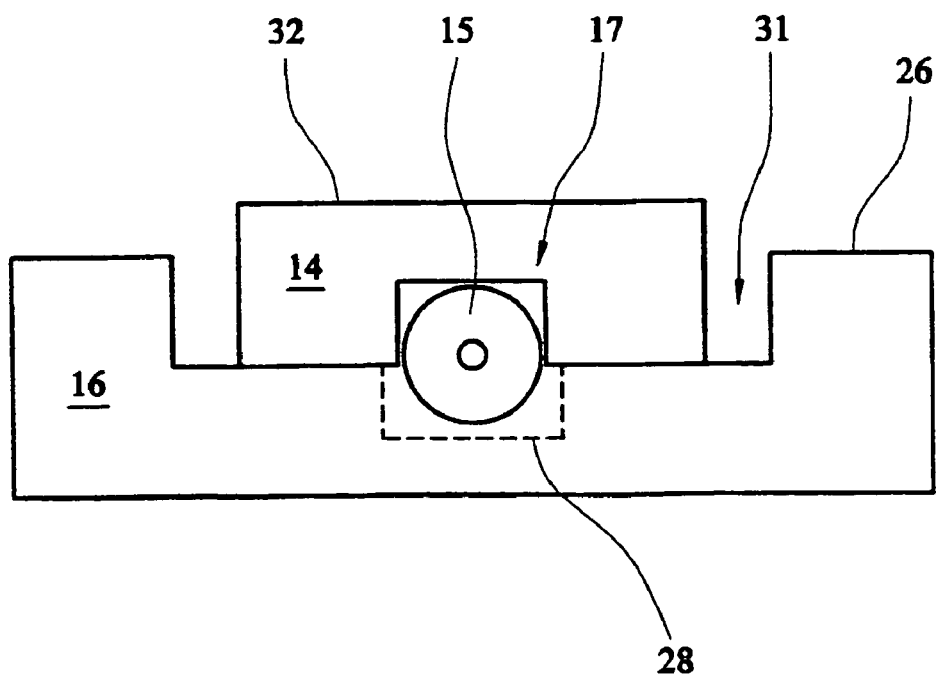
Figure 6:
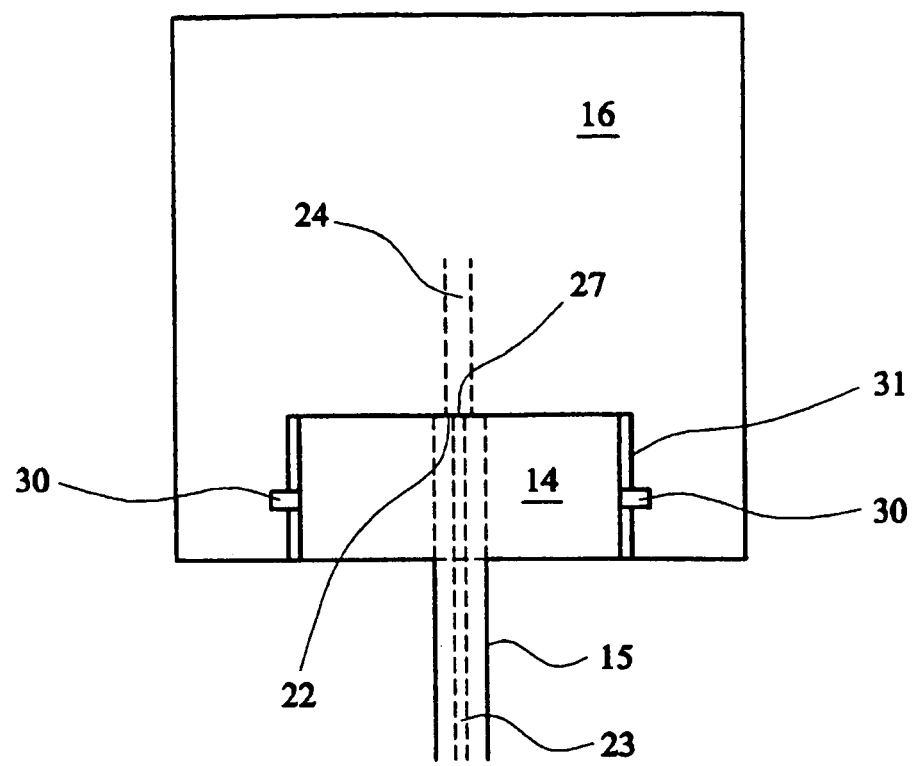
FIG. 6 shows a construction similar to that of FIG. 3b, but wherein a chip edge lies flush with a substrate edge.

Thus in this modification it is preferred to assemble the chip 14 with the fibre 15 mounted therein by cooling the fibre and placing it into position. After temperature equilibration sufficient for the fibre to be gripped, the assembly is cooled and/or the substrate 16 is heated the chip 14 is inverted, and the pegs 18 are inserted into the holes 19. After any necessary adjustment of position of the chip 14, the temperatures of the chip 14 and substrate 16 are allowed to equilibrate so that the chip is firmly mounted on the substrate.

Where it is required to couple the fibre 7 to a component such as a waveguide at or below the surface 26 of the substrate 16, an area of the substrate surface somewhat larger than that corresponding to the cross-section of chip 10 may be removed to the appropriate depth to bring the fibre end immediately adjacent the waveguide or other component with their optical axes aligned. This is shown by the depression 31 in the substrate surface 26 in FIGS. 5 and 6, and as can be seen in FIG. 5 the fibre core is well below the level of surface 26, at a location suitable for alignment with a waveguide located below the surface 26. In this type of construction, locating pins may be sited elsewhere, for example as shown there are pins 30 projecting from the side of the chip which can slide down into corresponding slot apertures in the substrate 16. The pins 30 can be a loose fit for fine adjustment of the position of the chip 14, an accurate fit for precise location in the direction of the fibre, or (optionally) they may be sized to be gripped in the apertures by the thermal process outlined above (or retention may be by any other known means, such as adhesive). Also shown in FIG. 6 is the feature that the chip may be mounted so that its edge coincides with (or optionally extends beyond) the edge of substrate 16, whereas FIG. 3 shows the case where it stops short of the edge. The upper surface of chip 14 may lie flush with or below the surface 26 as required.

By making the depression 31 with vertical side walls which are appropriately spaced, it is also possible to use these walls to grip the sides of the chip 14 by the thermal process generally described above. That is to say, the assembly of chip and fibre is cooled so that it can enter between the side walls with the fibre end 22 abutting and aligned with the component 24, and then allowed to warm so that it expands and exerts a retaining force on the walls. In such a case, the pins 30 could be omitted. Where the depression 31 occurs entirely within the boundary of surface 26 rather than being located at one edge as shown, it is possible to arrange for both opposed pairs of side walls to effect such gripping. However, this is not preferred on account of the additional stress which may be exerted on the substrate 16.

However, in many cases it is preferable to locate and grip the chip between one pair of opposed vertical walls and to allow relative movement between the chip and substrate along the other dimension prior to equilibration. For example by locating the chip between the pair of walls parallel to the fibre axis, it remains possible to slide the cooled chip in the direction of the fibre axis to obtain a good optical interface with a buried waveguide etc., which is maintained after temperature equilibration by the gripping effect of the walls parallel to the fibre.

The embodiments of FIG. 3 to 5 may be modified so that two or more chip substrates are mounted on or in the substrate 16, either simultaneously or sequentially. The fibres (or other optical components, see below) in the various chip substrates may be optical alignment, and preferably in abutment. Also, the slot in at least one chip substrate may comprise more than one optical component.

Figure 7:
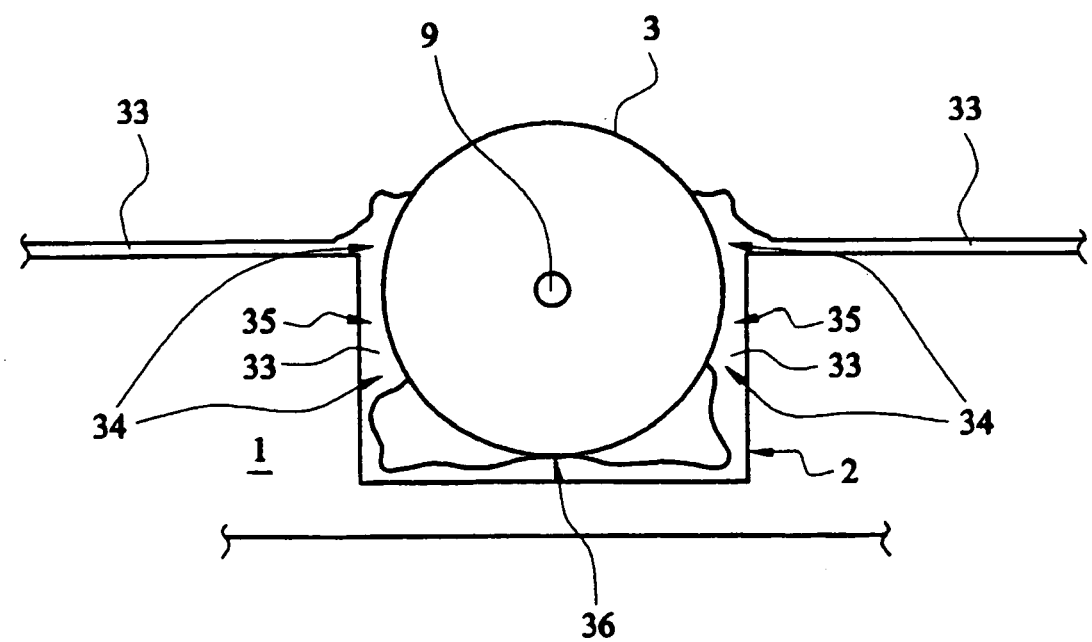
FIG. 7 shows an end cross sectional schematic view of an optic fibre mounted in a substrate and retained therein by wall shaping.

The embodiment of FIG. 7 shows a silica optical fibre 3 which is retained within the groove 2 of a silicon substrate 1 by wall shaping. The protective coating of a commercial fibre is stripped to reveal the silica cladding, of nominal diameter 125 microns, and it is inserted into the slot 2, which has been dry-etched to a depth of 130 microns (or at least greater than the fibre radius) and a width of 126 microns. The assembly is thermally oxidised at an elevated temperature, typically 800 to 900° C. for 18 hours, but less than the glass transition temperature of the fibre. The resulting conversion of the material of the walls and substrate surface to silicon dioxide 33 results in an increase in volume and a reduction in the slot width. As shown, the silicon dioxide 33 eventually thickens to such an extent that it grows round the fibre 3 for example in regions 34 (wall shaping). It may also exert a mechanical force on the fibre for example at pinch (compression) points 35 and a lower point 36, although the oxidation tends to be self-limiting, so that excessive mechanical forces are avoided. Subsequent cooling of the assembly after oxidation tends to increase the mechanical retention of the fibre in the substrate by differential thermal shrinkage. As shown, regions can still exist in the groove 2 which are not filled with oxide.

This technique is useful not only for silicon/silica based waveguides as shown, but also for silicon/silica based hollow waveguides, silicon/silica based micro-opto-electromechanical structures, and silicon/silica based vertical cavity structures, for example.

The thermal oxidation process is preferably a "wet" process. The time could be reduced by initially porosifying the sidewalls using anodic etching for example, to make a larger area available for oxidation. It will be understood that this process may be used as appropriate in lieu of, or in addition to, the differential process mentioned in relation to the earlier embodiments.

The above particular description has generally been in terms of the mounting and gripping of an optic fibre or fibres. While circular cross-section fibres are illustrated, other cross-sections of fibre may be similarly accommodated. Furthermore, it should be understood that while the invention is particularly suitable for use with fibres, at least one fibre may be replaced by another (small) optical component. In particular, such a component could be a fibre laser or other light source, or a photodetector. The invention thus makes it possible, for example, to form a system in which light is efficiently coupled between a source or detector and a fibre, or between a source and detector via a fibre.

The invention claimed is:

1. A method for mounting an optical element in a substrate comprising the steps of taking a substrate having a parallel sided slot formed therein the difference between a dimension of the optical element and the slot width at ambient temperature being a very small positive amount, producing a positive temperature differential between the substrate in the region of the slot and the optical element such that said dimension is now no more than the slot width, inserting the optical element therein in the presence of said temperature differential between the substrate and the optical element and thereafter allowing the temperatures of the optical element and the substrate to equilibrate.

2. A method according to claim 1 wherein the step of producing a positive temperature differential includes cooling the optical element.

3. A method according to claim 1 wherein the step of producing a positive temperature differential includes heating the first substrate.

4. A method according to claim 1 and comprising the further step of bonding the optical element to the first substrate.

5. A method according to claim 4 wherein the bonding step comprises applying adhesive to the optical element and first substrate.

6. A method according to claim 1 and comprising the further step of thermally oxidizing one or both of the first substrate and the optical element in the region of contact.

7. A method according to claim 1 wherein the substrate is rigid.

8. A method according to claim 7 wherein the substrate is of a ceramic or crystalline material.

9. A method according to claim 1 wherein the optical element is an optic fibre and said dimension is the or a diameter of the fibre, the slot depth being greater than half said dimension.

10. A method according to claim 9 and comprising the further step of mounting the first substrate to a second substrate with the fibre in optical alignment with an optical component on or in the second substrate.

11. A method according to claim 10 wherein the first substrate is mounted so that the fibre abuts the said component.

12. A method according to claim 10 comprising the further step of providing a depression in the said surface of said second substrate, wherein a surface of said second substrate includes the optical component recessed or formed therein and the mounting step comprises mounting said first substrate in said depression with the optic fibre in alignment with said optical component.

13. A method according to claim 12, the depression having vertical opposed walls, and wherein the mounting step comprises arranging said first substrate between the vertical opposed walls such that it is gripped mechanically there-between under compression.

14. A method according to claim 12 comprising the step of arranging an end of the optic fibre to lie substantially flush with an edge of the second substrate.

15. A method according to claim 10 comprising the step of providing the first and second substrate with co-operating projections and holes or slots for relative alignment thereof.

16. A method according to claim 15 wherein the step of providing the co-operating projections and holes or slots comprises arranging at least one projection to be a slightly oversize fit in its hole or slot in at least one dimension of the substrate surface, such that it may be cooled relative thereto for insertion, and is gripped thereby on temperature equalisation.

17. A method according to claim 15 wherein the step of providing the co-operating projections and holes or slots comprises arranging at least one projection to be an accurate fit in its hole in at least one dimension of the substrate surface for precise location in said at least one dimension.

18. A method according to claim 15 wherein the step of providing the co-operating projections and holes or slots comprises arranging the size of the projections relative to the holes or slots so that there is latitude for adjustment of alignment in one or both dimensions of the second substrate surface.

19. A method according to claim 1 wherein the depth of the slot is less than the said dimension so that a portion thereof projects above the surface of the first substrate.

20. A method according to claim 19 and comprising the further step of mounting the first substrate to a second substrate with the fibre in optical alignment with an optical component on or in the second substrate and wherein a groove is formed in the second substrate to house the projecting portion of the fibre.

21. A method according to claims 1 wherein the depth of the slot is equal to or greater than said dimension.

22. A method according to claim 1 wherein the optical element is an optic fibre, the substrate includes or is provided with an optical component with an input surface or aperature, and the inserting step comprises butting an end of the optic fibre against said aperature.

23. A method according to claim 22 wherein the slot forming step is controlled so that the fibre contacts the bottom of the slot when in alignment with said aperature.

24. A method according to claim 22 wherein said component is formed integrally within the substrate, adjacent or spaced below its surface.

25. A method according to claim 22 wherein said optical component is a separate component mounted within the substrate.

26. A method according to claim 25 wherein said component is mounted within a section of said slot.

27. A method according to claim 26 wherein said component is mounted within said section by producing a positive temperature differential between the slot section and the component, inserting the component, and allowing the temperature differential to disappear.

28. A method according to claim 25 wherein said component is another optic fibre.

29. A method according to claim 25 wherein said fibre and said component are mounted simultaneously to said substrate.

30. A method according to claim 25 wherein said fibre and said component are mounted sequentially to said substrate.

31. A method of coupling two optical fibres comprising the steps of taking a first substrate having a parallel vertical sided slot formed in a surface thereof, the difference between the diameter of the fibres and the slot width at ambient temperature being a very small positive amount, producing a positive temperature differential between the substrate in the region of the slot and the optical fibres such that the fibre diameter is now no more than the slot width, inserting the optical fibres therein with their ends butting in the presence of said temperature differential between the substrate and the optical element, and thereafter allowing the said temperature differential to disappear.

32. A method according to claim 31 wherein the substrate is rigid.

33. A method according to claim 32 wherein the substrate is of a ceramic or crystalline material.

* * * * *